US008510653B2

(12) United States Patent
Sinn et al.

(10) Patent No.: US 8,510,653 B2
(45) Date of Patent: Aug. 13, 2013

(54) COMBINATION CREATIVE ADVERTISEMENT TARGETING SYSTEM

(75) Inventors: Richard Sinn, Milpitas, CA (US); Takchun Tse, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

(21) Appl. No.: 12/946,450

(22) Filed: Nov. 15, 2010

(65) Prior Publication Data

US 2012/0124466 A1 May 17, 2012

(51) Int. Cl.
*G06F 17/00* (2006.01)

(52) U.S. Cl.
USPC ........................................................ 715/277

(58) Field of Classification Search
USPC ........................................................ 715/277
See application file for complete search history.

(56) References Cited

U.S. PATENT DOCUMENTS

| 7,680,888 B1* | 3/2010 | Marmaros et al. ............ 709/206 |
| 7,707,226 B1* | 4/2010 | Tonse ............................ 707/796 |
| 7,904,500 B1* | 3/2011 | Anderson ....................... 709/200 |
| 2005/0165893 A1* | 7/2005 | Feinberg et al. .............. 709/205 |
| 2006/0128404 A1* | 6/2006 | Klassen et al. ................ 455/466 |
| 2006/0259360 A1* | 11/2006 | Flinn et al. ...................... 705/14 |
| 2007/0088852 A1* | 4/2007 | Levkovitz ...................... 709/246 |
| 2007/0239542 A1* | 10/2007 | Shapiro ........................... 705/14 |
| 2008/0147501 A1* | 6/2008 | Gilliam ........................... 705/14 |
| 2008/0243619 A1* | 10/2008 | Sharman et al. ................ 705/14 |
| 2008/0250107 A1* | 10/2008 | Holzer et al. .................. 709/206 |
| 2009/0076917 A1* | 3/2009 | Jablokov et al. ............... 705/14 |
| 2009/0083032 A1* | 3/2009 | Jablokov et al. .............. 704/235 |
| 2009/0164312 A1* | 6/2009 | Nadig ............................. 705/14 |
| 2009/0203359 A1* | 8/2009 | Makhoul et al. ............ 455/412.2 |
| 2009/0234711 A1* | 9/2009 | Ramer et al. ..................... 705/10 |
| 2009/0254616 A1* | 10/2009 | Cheung et al. ................. 709/204 |
| 2009/0292526 A1* | 11/2009 | Harari et al. ...................... 704/9 |
| 2010/0041422 A1* | 2/2010 | Wormald et al. ............. 455/466 |
| 2010/0058203 A1* | 3/2010 | Moudy et al. ................. 715/759 |
| 2010/0082411 A1* | 4/2010 | Goyal et al. .................... 705/14.4 |
| 2010/0093317 A1* | 4/2010 | Ghotge et al. ............. 455/414.1 |
| 2010/0094878 A1* | 4/2010 | Soroca et al. ................. 707/748 |
| 2010/0205562 A1* | 8/2010 | de Heer ........................ 715/810 |
| 2010/0318620 A1* | 12/2010 | Bansal et al. ................. 709/206 |
| 2011/0022464 A1* | 1/2011 | Dunn et al. ................. 705/14.52 |
| 2011/0119125 A1* | 5/2011 | Javangula et al. ......... 705/14.43 |
| 2011/0320273 A1* | 12/2011 | Miranda-Steiner ........ 705/14.49 |
| 2012/0078961 A1* | 3/2012 | Goenka ......................... 707/778 |

OTHER PUBLICATIONS

Randanathan et al., Advertrising in a Pervasive Computing Environment, ACM. WMC '02 Proceedings of the 2nd International Workshop on Mobile Commerce, New York, NY, 2002, p. 10-14.*

* cited by examiner

*Primary Examiner* — Frank D Mills
(74) *Attorney, Agent, or Firm* — Michael J. Buchenhorner

(57) ABSTRACT

A system and method for serving ad creatives to a user includes steps of: monitoring open conversation windows of a client during a login session, wherein each open conversation window is a conversation between the client and a correspondent; receiving client state information associated with each open conversation window; sending the client state information to client state information store; responsive to initiation of a new client session, retrieving the client state information; dynamically computing a template for a combination ad creative customized for each open conversation window associated with the new client session; generating the combination ad creative from the template; and serving the combination ad creative to the client.

19 Claims, 11 Drawing Sheets

FIG. 1 - Prior Art

Combined Ad Configuration – Vertical Path

Time-of-day Ad Configuration

COMBINATION CREATIVE ADVERTISEMENT TARGETING SYSTEM

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information technology, and more particularly relates to the field of advertising on the world-wide web.

BACKGROUND OF THE INVENTION

In the advertisement world, the term "creatives" indicates the advertisement itself, whether it be a banner, rich media, or text advertisement. Common creative types include GIF, JPEG, Java, HTML, and Flash ad streaming audio/video. The form factor of creatives is usually defined as the product of length and width (l×w) in pixel size of the slot where the advertisement is served. FIG. 1 shows some exemplary creatives. Most of the advertisement networks use the following de facto standard sizes:
  120×240 Vertical banner
  120×600 Skyscraper
  125×125 Square button
  160×600 Wide Skyscraper
  180×150 Rectangle
  234×60 Half Banner
  240×400 Vertical Rectangle
  250×250 Square pop-up
  300×250 Medium Rectangle
  468×60 Full banner
  728×90 Leaderboard
  600×250 Wide Rectangle The current technology serves an ad in the same slot over and over again and hopes that reader will click on it. Each time the user logs in, he/she will see the same advertisement ("ad"). There is needed a system and method to server user ads in a more meaningful manner in order to overcome the shortcomings of the known art.

SUMMARY OF THE INVENTION

Briefly, according to an embodiment of the invention a method for serving ad creatives to a user includes steps or acts of: monitoring open conversation windows of the client during a login session, wherein each open conversation window comprises a conversation between said client and a correspondent; receiving client state information associated with each open conversation window; sending the client state information to a client state information store; responsive to initiation of a new client session, retrieving the client state information; dynamically computing a template for a combination ad creative customized for each open conversation window associated with the new client session; generating the combination ad creative from the template; and serving the combination ad creative to the client.

According to another embodiment of the present invention, a system for serving ad creatives to a client includes: a client state information store for storing client state information from open conversation windows of the client during a login session, wherein each open conversation window includes a conversation between the client and a correspondent.

The system further includes a server device in operative communication with the client. The server device includes: an information processing device used as a monitor engine for monitoring the open conversation windows of the client during the login session, receiving client state information associated with each open conversation window, and sending the client state information to the client state information store; a customization engine that retrieves the client state information to dynamically compute a template for a customized ad creative; an ad generator engine for generating the combination ad creative from the template; and a communication interface for serving the combination ad creative to the client.

According to another embodiment of the present invention, a computer program product embodied as a computer readable storage medium includes program for causing a computer to perform the method steps as discussed above.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
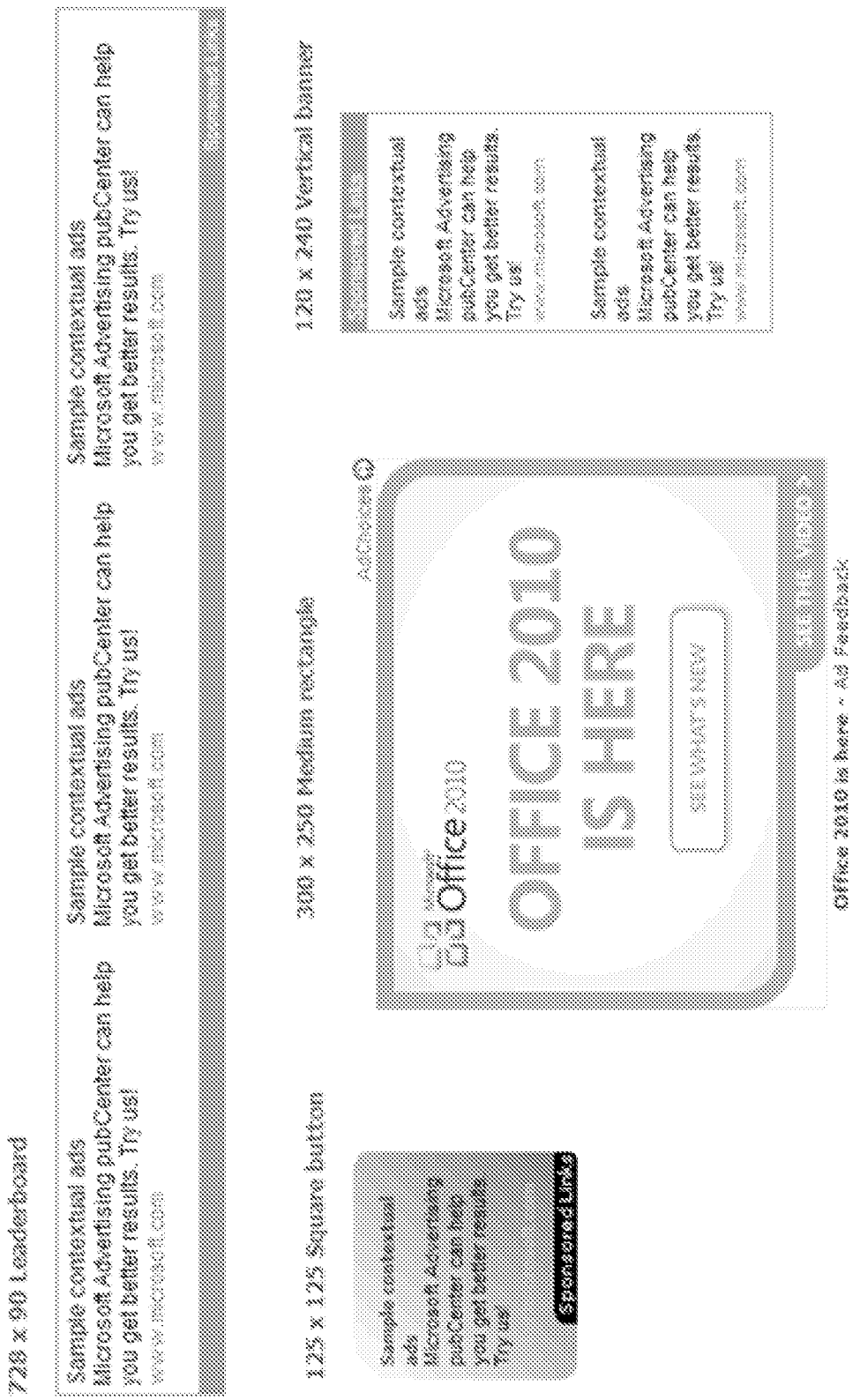
FIG. 1 shows sample form factors for various creatives, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a novel method to generate advertisement creatives that was not possible before. The main idea of the invention is this: on the server-side, we keep track of all the open conversation "windows" during a user login session and use that information to generate and configure ads that are customized to the user session and served on the client-side.

The advantages are:

1) the ability to serve ad creatives in a combination manner;

2) the combination is dynamic and different configurations can be presented to the user every time he/she logs in, thus presenting a refreshing ad experience every time;

3) the ads are not bounded to one slot;

4) more real estate is available for innovation in creating advertisement in general; and 5) different configurations are available for targeting (from a static configuration such as a "big square" to the fully dynamic storyboard and time-of-day configurations).

While there are innovations on the technologies (flash, video, and so forth) used to build ad creatives, the form factor of creatives has remained the same. Using this invention, creatives can be combined and configured to create various different ways of creative presentation. As a result, new types of creative combinations can be made available for targeting advertisements for users.

System Overview.

Figure 2:
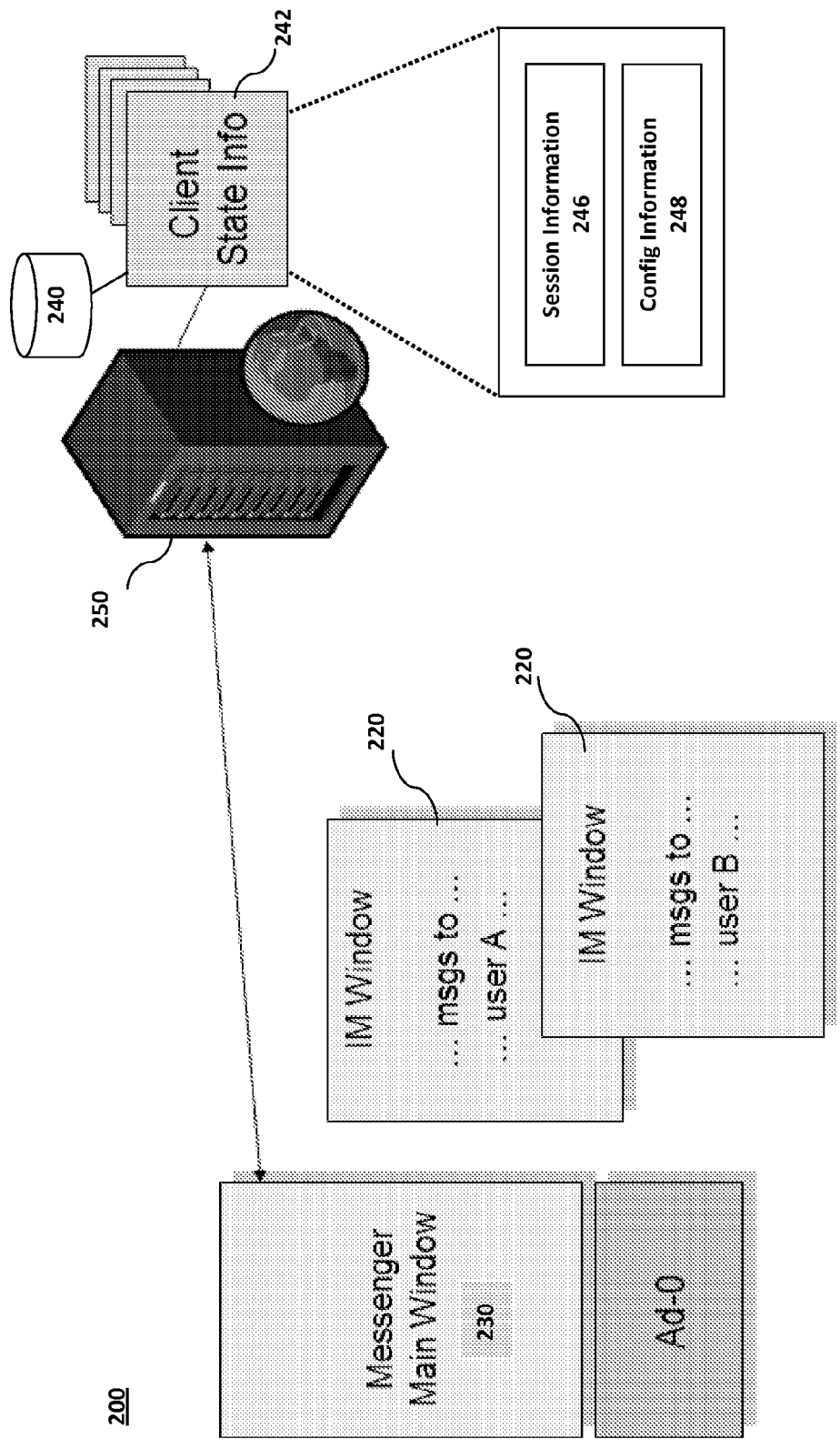
FIG. 2 shows a simplified overview of a system configuration according to an embodiment of the present invention.

Referring now to FIG. 2 there is shown a simplified overview of a system configuration 200 according to an embodiment of the present invention. A "Window" 220 can be an opened Microsoft/Mac OS window or an overlay div within a browser, among others. A div, (abbreviation for 'division') is an HTML tag used to create containers around groups of content on Web pages. A div is usually given a unique id to distinguish it from other div elements on the same page. A div is designed to work in conjunction with CSS (cascading style sheets), used for formatting and positioning.

In FIG. 2 the Windows 220 are represented as Instant Messaging ("IM") Windows denoting IM sessions which are currently active in the Messenger Main Window 230. Communication occurs through the MPOP (Multiple Point of Presence) protocol. Those with knowledge in the art will appreciate that the invention as described can be advantageously used with other types and formats of user sessions and is not restricted to Instant Messaging.

The Messenger Server 250 receives and processes information from the Client 210. The Messenger Server 250 receives Client State Info 242 from the Client 210 and stores the Client State Info 242 in the Client State Info Store 240. Note that the Client State Info Store 240 in FIG. 2 is depicted as a separate entity, such as a database. One with knowledge in the art will appreciate that the Store 240 may also be incorporated and part of the Server 250. In Yahoo!® Messenger, state is defined as a collection of current Yahoo!® Messenger inner workings. The Client State Info 242 may contain current active conversation sessions with source/target buddies, message content, invites, and any conference parameters such as active participants and current conference messages.

State information from the user session is sent (via State Transfer) to the Messenger Server 250 as Client State Info 242 upon occurrence of an event. State Transfer (ST) refers to the transportation and transformation of state from one Messenger MPOP node to another Messenger MPOP node with the same authenticated Yahoo id. A transformation may be necessary as the MPOP node can be of the desktop, web browser or mobile type. For example, an opened window in the desktop Client 210 is transported and transformed into an opened tab in a web browser Messenger client.

Event is an action that will contribute to a state. For example, an event can be the opening of a Window 220, repositioning of a Window 220, or closing of a Window 220. The State client sends a chronological order of State events to the Messenger Server 250. The aggregation of these events makes up the Client State Info 242.

A state event can be represented as an ordered n-tuple, as in set theory. It is a sequence of n elements where n is a positive integer. Let E be the state event, any representation of E can be: E=(eventtype, objid, objtype, position1, position2, sourceBuddy, targetBuddy, currentIMV); or short-handed as: E=(eventtype, objid, objtype, p1, p2, sb, tb, imv), where n is 8 in the above example. The objid is an integer number used to uniquely identify a state event. The objid is generated by the source ST client. There are three types of state events. They are create, update and delete. Eventtype={create, update, delete}.

A create event will create an event on the Messenger Server 250 with the corresponding objid under the source Client 210. An update event will use the objid as key and update the elements of the event tuple. A delete event will use the objid as key and delete the event tuple on the Messenger Server 250. The create event dictates the value of n in the event tuple. For an update or delete event to be successful, the objid and n must be matched. Object Type (objtype) is used to indicates the type of object being saved in the Messenger Server 250. The supported types are "im" and "conf"

Three simple rules are used to govern the precedence of the event types: 1) A delete event overwrites the element data in create and update events; 2) an update event overwrites the element data in a create event; and 3) a new create event overwrites the element data in the current create, delete, and update events (with same objid and objtype).

Additional state information is also provided to personalize the creatives according to user tastes and preferences, along with other parameters. This information includes, but is not limited to: the frequency with which a particular item of content appears in the conversation, identifying information about the target users, and top related news update clicks related to the content and/or the users.

When the user (Client 210) initiates a login session (an event of eventtype={create}) using the Messenger Main Window 230, the Client State Info 242 file containing information that was gathered from a previous session for that Client 210 will be fetched by the Server 250. Configuration parameters within the Client State Info 242 direct the Messenger Server 250 to combine and reconfigure the opened windows 220 from the new session with the Client State Info 242 to present the combination creatives in a way that is meaningful to the Client 210 vis-à-vis the Client's current correspondents.

For example, the Client State Info file 242 in FIG. 2 will contain information indicating that two conversation Windows 220 are open in the Client's session, one Window 220 is open with user A and one Window 220 is open with user B. The file 242 will contain content (session) information 246 from both Windows 220 and configuration information 248 about the Windows 220. The configuration information 248 can include the size of the Window 220 and the placement of the Window 220 within a page. The configuration information 248 also includes all necessary information for another client to recreate these two Windows 220 in another login location. For example, the background theme of both Windows 220, the plug-ins (with additional features) loaded in the Windows 220, and the user interface (UI) configuration of the Windows 220, including whether the emoticon selectors and audible are opened or not.

Assume the conversation content with user A is mostly movie-related and the conversation content with user B is mostly video game-related. Preferably, according to one embodiment of the present invention, the information from this session is sent as a tuple (an ordered list) of information {nbr of windows, participants, content} such as (nbr=2, participants=A, B, content=A:"movie", B:"game") to the server for targeting ads to serve during subsequent sessions that involve the Client 210. For example, assume that at a later point in time Client 210 is in a session with user B. The Server 250 will retrieve the Client State Information 242 for the Client 210 and will serve a creative ad targeting the "game" content from Client's 210 previous session with user B.

Figure 3:
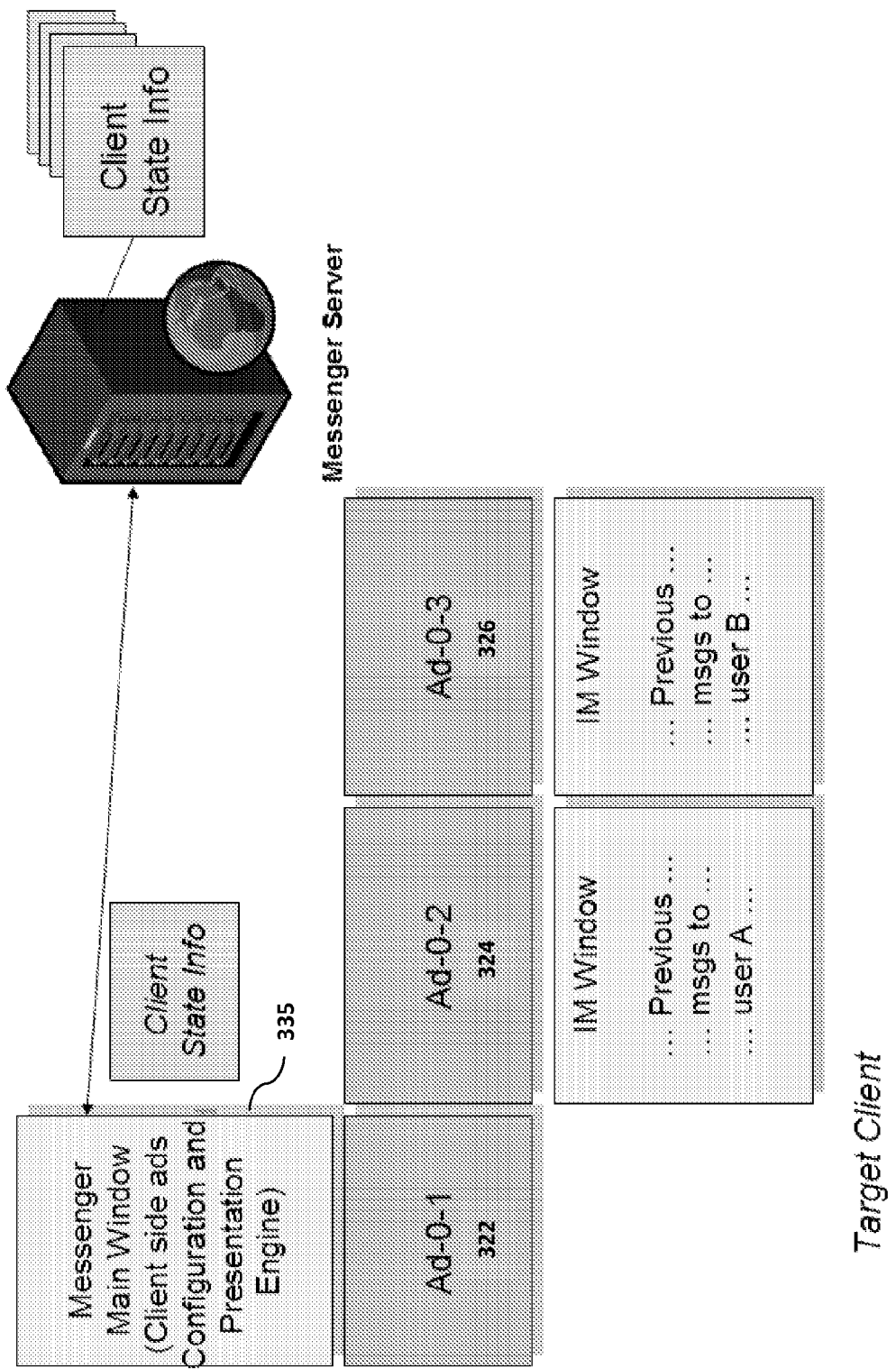
FIG. 3 shows the Client-Side Ads Configuration and Presentation Engine according to an embodiment of the present invention.

FIG. 3 shows the Client-side Ads Configuration and Presentation Engine 335 of the Messenger Main Window 230. The Client-side Ads Engine 335 controls how combination creatives are displayed on the Messenger Window 230 according to the configuration information provided by the Server 250. The Client-side Engine 335 receives the configuration information from the Server 250 and presents the ad creatives to the Client 210 as indicated by the configuration information. Note that even though the Server 250 provides the configuration and the information to be included in the creatives, the Client-side Configuration Engine 335 will require system state information from the client computer in order to determine the best manner in which to display the creatives.

In this example, advertisement creatives Ad-0-1 322, Ad-0-2 324, and Ad-0-3 326 work together to form a single leaderboard. This leaderboard is a combination of creatives that can present a type of advertisement that has not been seen by the Client 210 before. For example, the creatives can include: a movie ad with different sequences, a product tutorial with two interactive parts and a general info part, among others.

Method.

Figure 9:
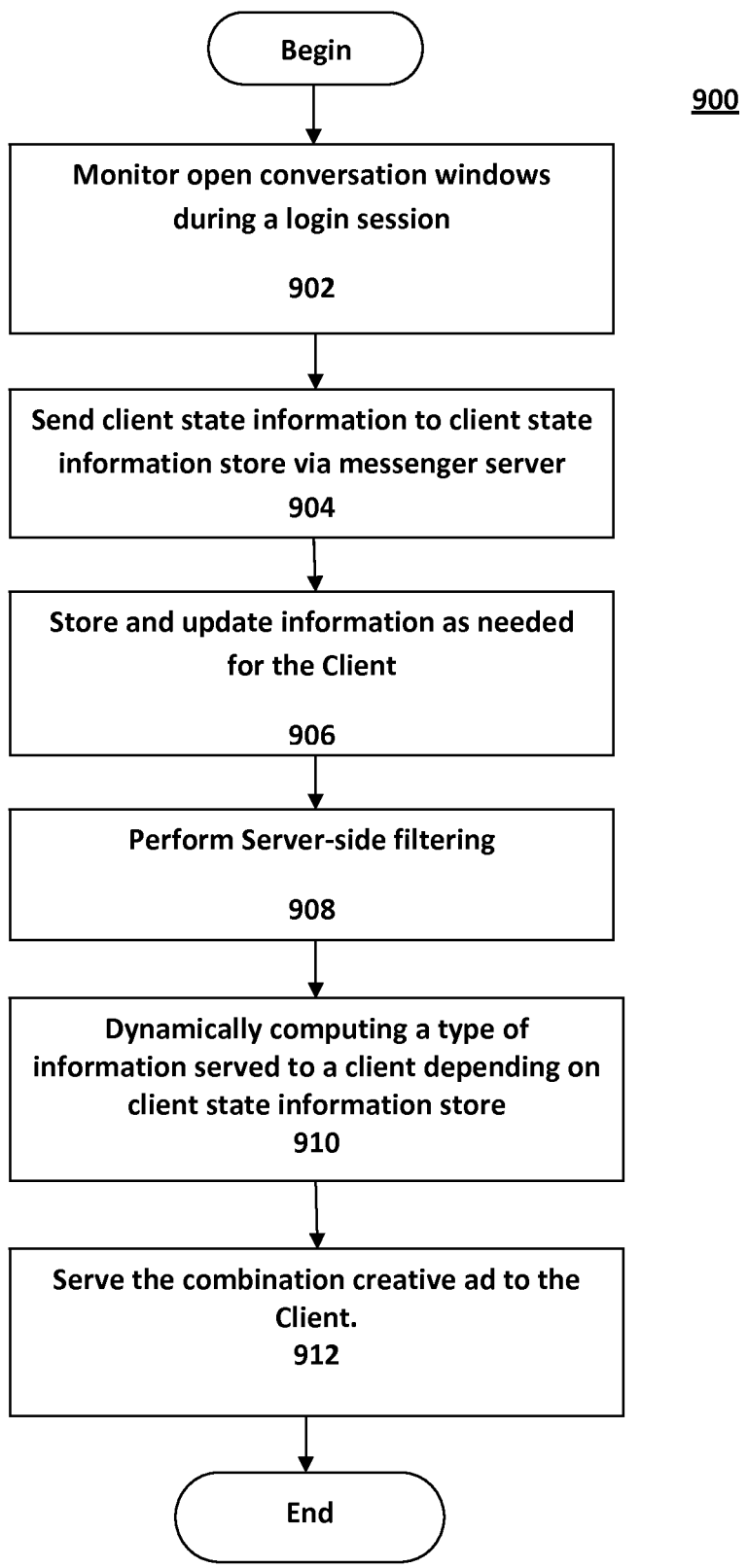
FIG. 9 is a flowchart of a method of combining creatives, according to an embodiment of the present invention.

Referring now to FIG. 9 there is shown a high-level flowchart 900 of a method for combining and serving creative ads according to an embodiment of the present invention. The process begins at step 902 with the Messenger Server 250 monitoring all open conversation Windows 220 during a login session for a Client 210. Typically, a Client 210 will engage in multiple IM conversations during a login session. An IM conversation is a conversation between the Client 210 and a Buddy. Each IM conversation is occurring with a different Buddy and is displayed in a separate conversation Window 220. The Buddies in FIGS. 2 and 3 are listed as User A and User B.

In step 904 the Messenger Server 250 sends the state information collected from each of the Windows 220 to the Client State Info Store 240 where this state information is stored and updated in step 906 as needed for that Client 210. The information is stored as Client State Info 242. Preferably, the information is stored in chronological order to provide a temporal history of the IM session.

In step 908, the Messenger Server 250 performs server-side filtering of information, which may include dropping state information that is too long or contains executable code, among others. This step is optional as some clients (such as some mobile clients) might not want to request all conversation between buddies due to the cost of SMS.

The Messenger Server 250 uses the state information to generate the information for multiple advertising creatives (directed to the multiple IM sessions) and in step 910 is able to dynamically compute the type of information served to the Client 210 depending on the stored Client State Info 242 in order to design the combination creative to serve to the Client 210. The combination creative includes the multiple advertising creatives.

Then in step 912, the Server 250 provides the combination creative and the configuration information to the Client 210. The Client 210 will use the Client-Side Presentation and Configuration Engine 335 to display the combination creative in such a manner that enables storytelling in a combination ad environment where the Client 210 is told what happens in the story. For example, the Server 250 creates a combination creative that includes an ad specifically targeted for the IM conversation with User A along with an ad specifically targeted for the IM conversation with User B.

Creative Configurations.

Figure 4:
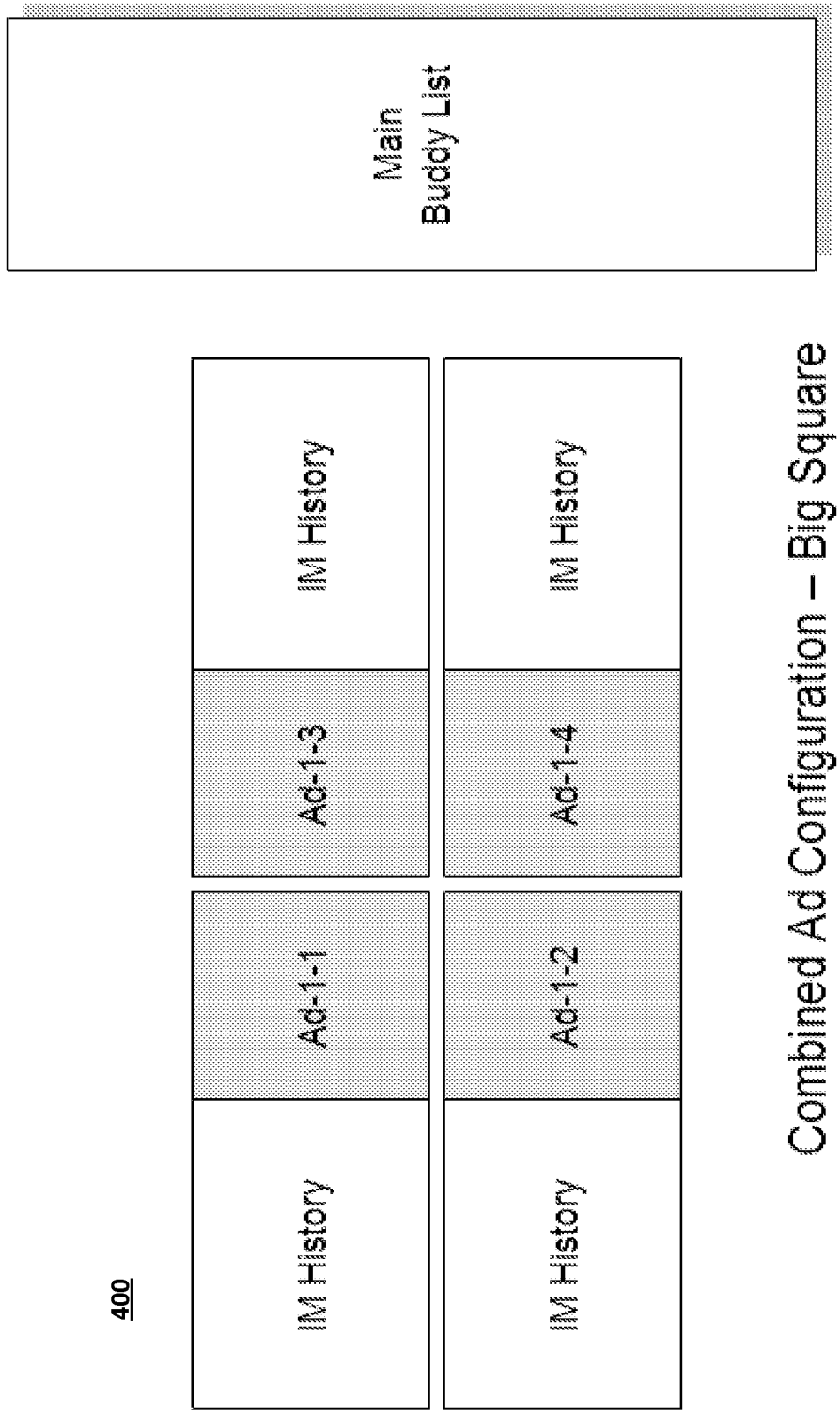
FIG. 4 shows a block diagram of creatives in a big square form factor, according to an embodiment of the present invention.
Figure 5:
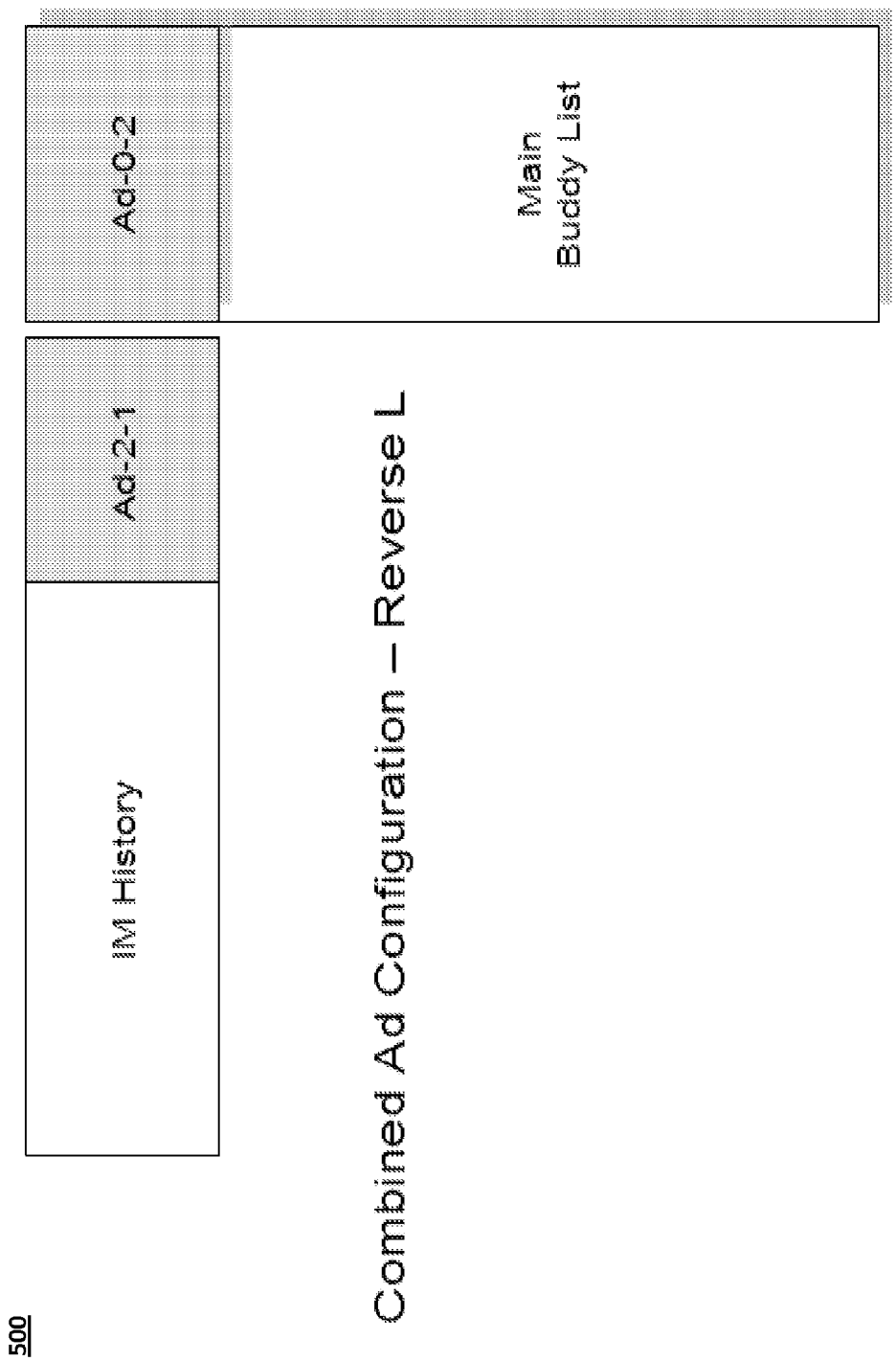
FIG. 5 shows a block diagram of creatives in a reverse "L" form factor, according to an embodiment of the present invention.
Figure 6:
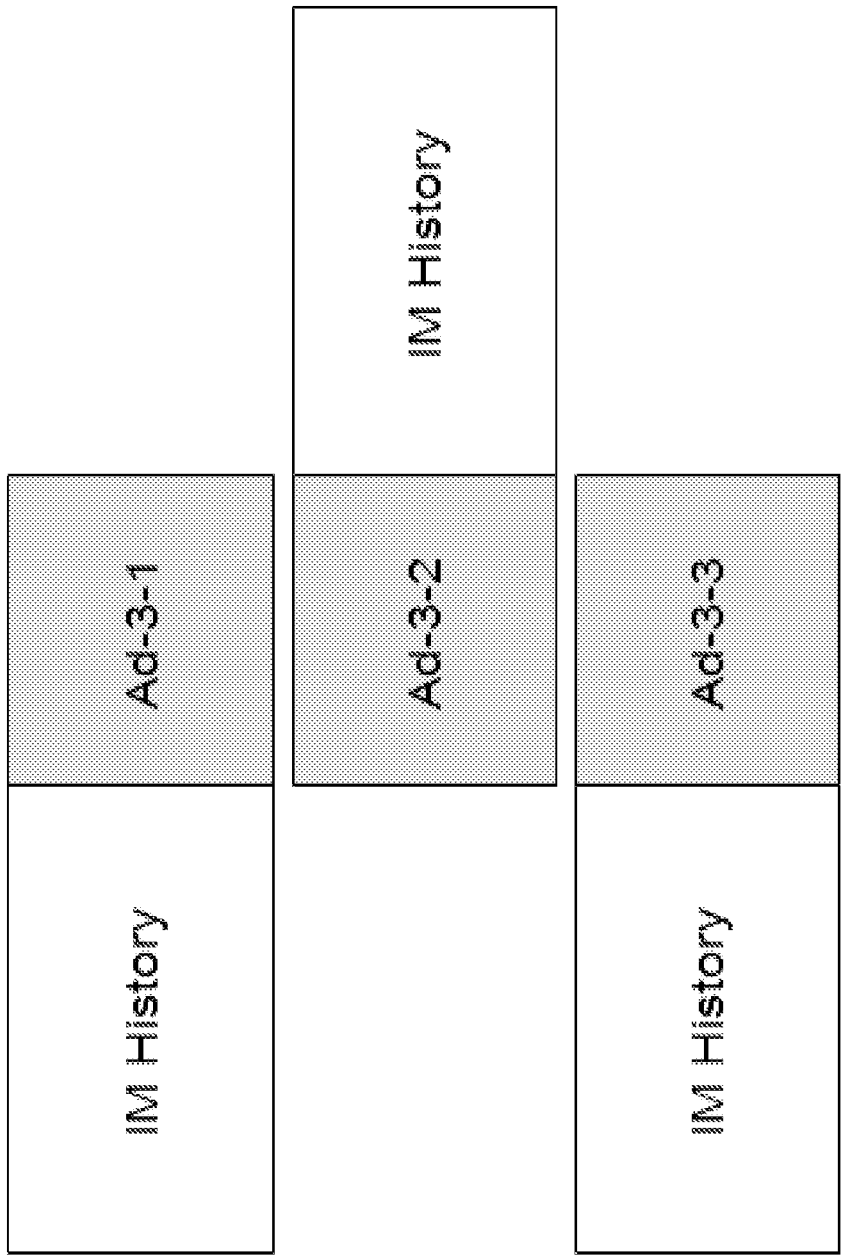
FIG. 6 shows a block diagram of creatives in a vertical form factor, according to an embodiment of the present invention.
Figure 7:
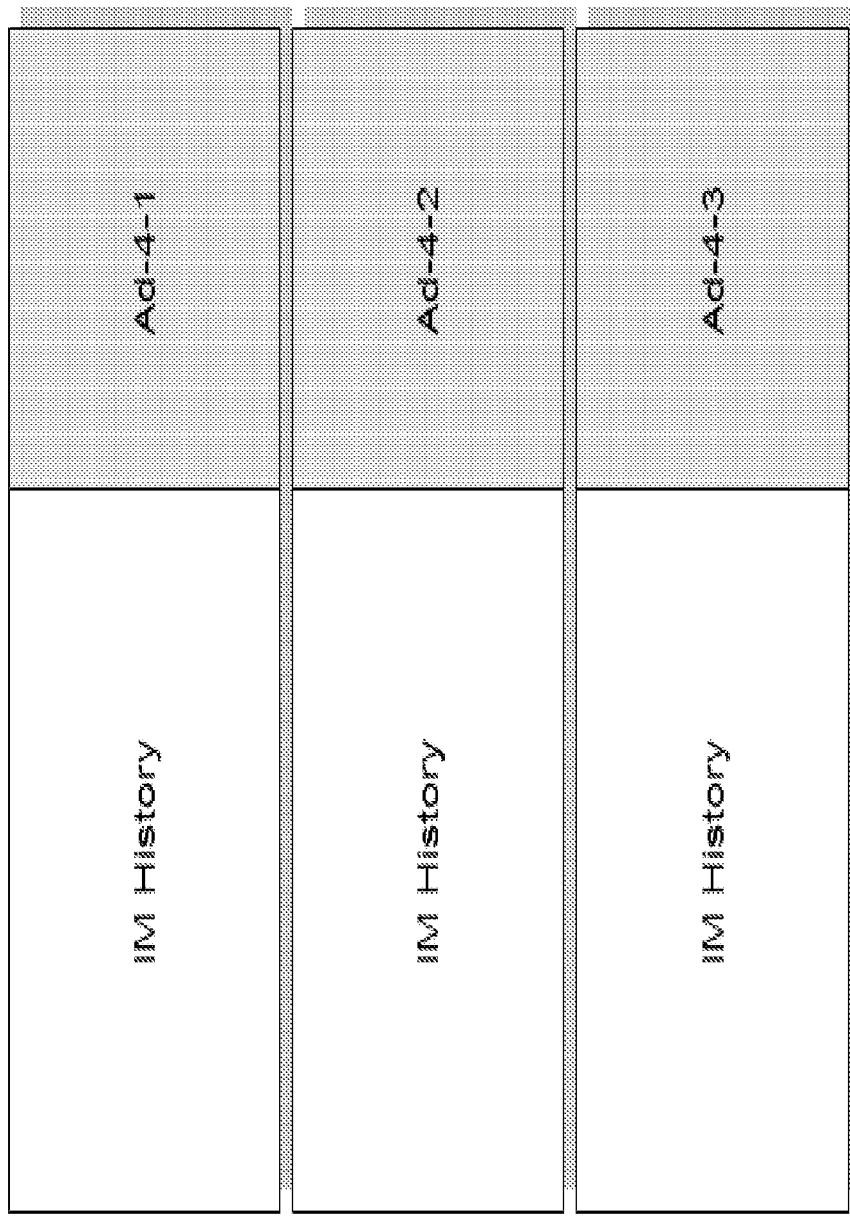
FIG. 7 shows a block diagram of a storyboard ad configuration, according to an embodiment of the present invention.

The following is a list of possible combinations of creatives served to the Client 210. FIG. 4 shows a combination ad in a big square form factor 400. The configuration of FIG. 4 includes four different advertisement creatives tied to an IM History for each of Buddies participating in the session with the Client 210. FIG. 5 shows a combination ad in a reverse "L" form factor. FIG. 6 shows a combined ad configuration 600 in a Vertical Path form factor. FIG. 7 shows a storyboard ad configuration 700. The Storyboard Ad Configuration 700 enables story telling in a combination ad environment where you can use the ads to tell what happens first, next and final to better target users. For example, an ad can tell a story of before using the product, how to use the product, and after using the product. The target readers will then be able to comprehend the ad a lot better.

Figure 8:
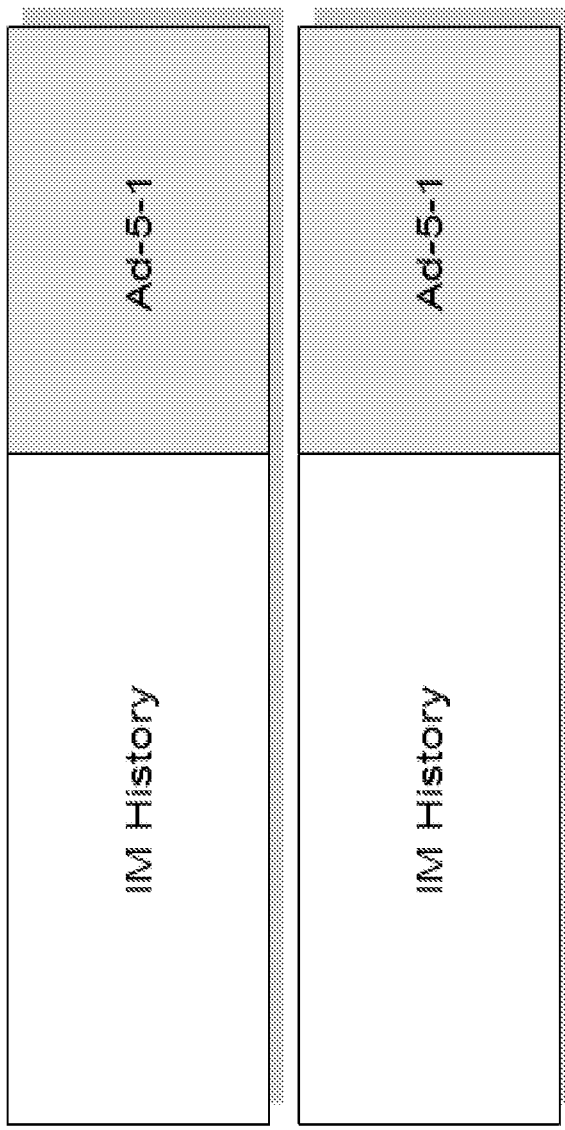
FIG. 8 shows a block diagram of a time-of-day ad configuration, according to an embodiment of the present invention.

FIG. 8 shows a Time-of-day ad configuration 800 which presents a different creative combination depending on a time-of-day parameter in the Client State Info 242. The time-of-day parameter is the time-of-day when the Client 210 initiates the login session. This parameter is stored as part of the Client State Info 242. For example, there can be an AM combination and a PM combination. The AM configuration may display ads for TV shows that air in the morning and the PM confirmation may display ads for TV shows that air in the evening. Since the client state information is dynamic and the combination changes depending on the configuration, the ads that are served using this method present an extremely refreshing way to catch a reader's attention and target them in ways that was not possible before.

Client-Side System.

Figure 10:
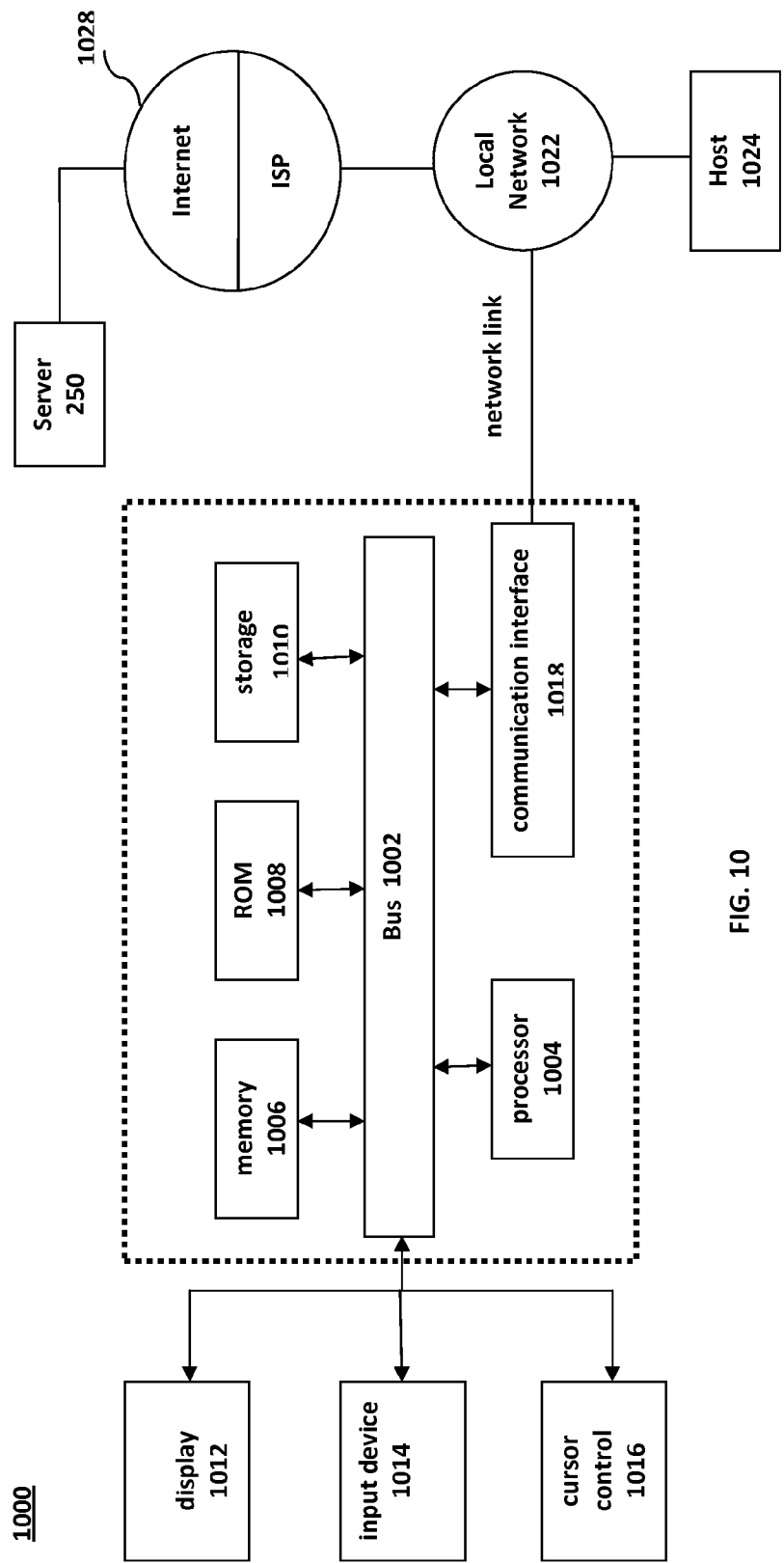
FIG. 10 is a simplified block diagram of the client-side system, according to an embodiment of the present invention.

Referring now to FIG. 10 there is shown a high-level block diagram illustrating an information processing system 1000 upon which an embodiment of the present invention may be implemented. System 1000 includes a bus 1002 or other communication mechanism for communicating information, and one or more processors, such as processor device 1004 coupled with bus 1002 for processing information. System 1000 also includes a main memory 1006, such as a random access memory (RAM) or other dynamic storage device, coupled with bus 1002 for storing information and instructions to be executed by processor device 1004. Main memory 1006 also may be used for storing temporary variables or other intermediate information during execution of instructions to be executed by process device 1004. System 1000 further includes, inter alia, a read only (ROM) memory 1008 or other static storage device, coupled with bus 1002 for storing static information and instructions for processor device 1004. A storage device 1010, such as a magnetic disk or optical disk, is provided and coupled with bus 1002 for storing information and instructions.

System 1000 is operatively coupled with display 1012, such as a computer monitor, for displaying information to the user. An input device 1014, including alphanumeric and other keys, is also operatively coupled with the system 1000. A cursor control device 1016, such as a mouse, a trackball, or cursor direction keys is provided for communicating direction, information and command selections to processor 1004 and for controlling cursor movement on display 1012. The display 1012 may also function as the input device such as in the touch-screen interfaces in the iPad™ and iPhone® mobile digital devices by Apple®, among others.

In an embodiment of the present invention, computer system 1000 is used for displaying creatives generated by the Messenger Server 250. According to one embodiment of the invention, the creatives are displayed in response to processor device 1004 executing one or more sequences of one or more instructions contained in memory 1006. The creatives are displayed on display 1012. The user of computer system 1000 uses the input device 1014 to enter the search query and then relies on the cursor control device 1016 to enter the mouse gestures.

System 1000 also includes a communication interface 1018 providing a two-way communication coupling with a network link 1020 that is connected to a local network 1022. Examples of a communications interface 1018 may include a modem, a network interface (such as an Ethernet card), a communications port, a PCMCIA slot and card, etc. Software and data transferred via communications interface 1018 are in the form of signals which may be, for example, electronic, electromagnetic, optical, or other signals capable of being received by communications interface 1018. These signals are provided to communications interface 1018 via a communications path (i.e., channel).

Network link 1020 typically provides data communication through one or more networks to other devices. Network link 1020 may provide a connection through local network 1022 to a host computer 1024 or to a web browser providing access, through the Internet to a Search Engine 1028.

Server-Side System.

Figure 11:
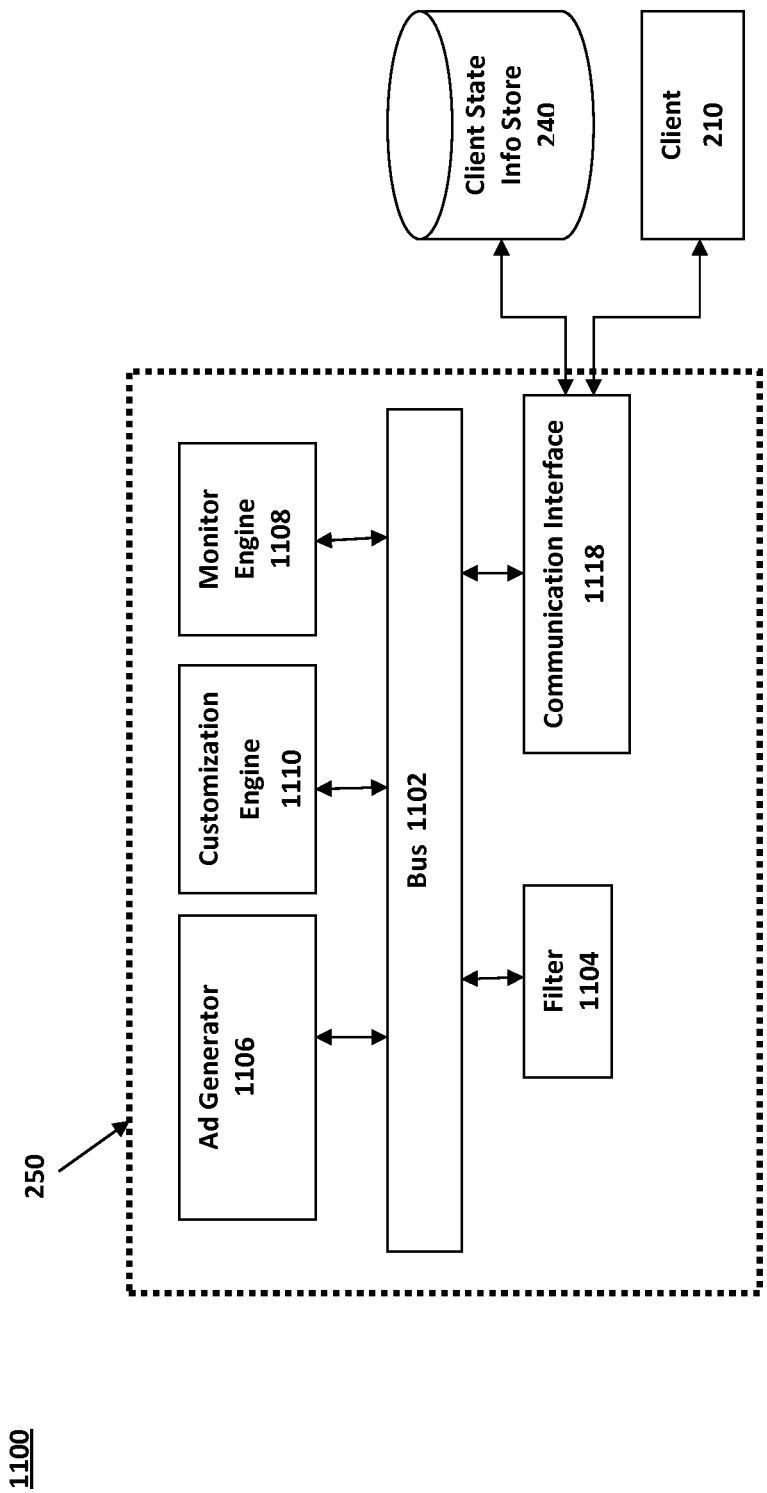
FIG. 11 is a simplified block diagram of the server-side system, according to an embodiment of the present invention.

Referring now to FIG. 11, there is depicted a simplified block diagram of an exemplary server-side system 1100 configured according to an embodiment of the present invention. The Messenger Server 250 can be embodied as a single computer device or distributed among several processor devices. The Server 250 as depicted in FIG. 11 contains the following components:

The Communications Interface 1118 represents an input/output subsystem for enabling operative communication with the Client 210, the Client Info Data Store 240 and other servers, search engines, indices, and so on as required for generating ad creatives according to the invention. The Communications Interface 1118 receives the client state info 242 from the Client 210 and stores it in the Data Store 240. The Interface 1118 receives the Client State Info 242 from the Data Store 240 and also transmits the generated ad creatives to the Client 210.

The Monitor Engine 1108 monitors and receives the communication in the open conversation windows. The Monitor Engine 1108 is alerted by receipt of a state event such as a session initiation. The Monitor Engine 1108 monitors open conversations until receipt of a state event such as a session termination. The Client 210 sends a chronological order of State events to the Messenger Server 250. This creates a temporal history of the content from the Client's sessions.

The Filter 1104 filters the information stored in the Client State Info 242 to remove any extraneous data. Extraneous data is any data that is not relevant to the Client conversations, or is considered confidential. For example, the Filter 1104 may dispose of content that is too long or contains executable code; or content related to company information, personal medical information, salutations, and obscenities. Any data not considered relevant is disposed of.

The Filter 1104 can also clean up data from older conversations in order to maintain a fresh inventory of client data. For example, the Filter 1104 may be instructed to keep Client State Info 242 for two months and delete any data older than two months. As an alternative, the Filter 1104 may remove any data that is current, but not repetitive. This is because content that appears frequently is considered more relevant. The Filter 1104 may employ an algorithm for weighting the content such that content appearing multiple times is given greater weight than a singular appearance.

Upon receipt of an indication of a session initiation, the Customization Engine 1110 takes the filtered Client State Info 242 from the Store 240 and uses the Info 242 to combine the session information from the Client's 210 previous conversations with the current correspondents into conversation history windows for each correspondent. Then the Customization Engine 1110 configures a template in a form factor that allows for accommodating advertisements adjacent to the conversation history windows.

The Ad Generator 1106 retrieves advertisements that "match" the Client State Info 242. For example, if the Client State Info 242 indicates that Client 210 has had multiple conversations with User A regarding Harry Potter books, the Customization Engine 1110 will retrieve advertisements for the latest Harry Potter movie. The Customization Engine 1110 will incorporate the retrieved advertisements into the template to generate a combination ad creative customized for the current open conversation windows. This combination ad creative will be served to the Client 210. The Ad Generator 1106 further provides to the Client 210 configuration information to enable the Client 210 to display the combination ad creative.

A bus 1102 facilitates communication among the components. It should be noted that the components as depicted herein may be embodied as distinct and separate hardware components operating within the Server 250, or as logical components embodied within a processor unit.

As will be appreciated by one skilled in the art, the present invention can be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium, such as a CD-ROM or DVD-ROM.

In this document, the terms "computer program medium," "computer usable medium," and "computer readable storage medium" are used to generally refer to non-transitory media such as main memory and secondary memory, removable storage drive, a hard disk installed in hard disk drive, and others. These computer program products are means for providing software to the computer system. The computer readable storage medium allows the computer system to read data, instructions, messages or message packets, and other computer readable information from the computer readable medium.

Computer programs (also called computer control logic) are stored in main memory and/or secondary memory. Computer programs may also be received via communications interface. Such computer programs, when executed, enable the computer system to perform the features of the present invention as discussed herein. In particular, the computer programs, when executed, enable the processor to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus capable of performing the described invention.

Therefore, while there has been described what is presently considered to be the preferred embodiment, it will understood by those skilled in the art that other modifications can be made within the spirit of the invention. The above descriptions of embodiments is not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for serving ad creatives to a client, said method comprising steps of:
using a processor device configured to perform:
monitoring a plurality of open conversation windows of the client during a login session, wherein each open conversation window comprises a conversation between said client and a correspondent such that said client is corresponding with a different correspondent in each window;
receiving client state information associated with each open conversation window; said client state information comprising:
an indicator of content of the conversation between the client and the correspondent associated with that open conversation window; and
an identifier of the correspondent;
sending the client state information for each open conversation window to a client state information store for storage;
receiving an indication of initiation of a new login session for the client;
responsive to the initiation of a new login session, retrieving the client state information for the correspondents associated with said new login session;
dynamically computing a template for a combination ad creative customized for each open conversation window associated with the new login session, wherein said combination ad creative comprises multiple ads targeting indicated content of previous conversations with identified correspondents as determined by the retrieved client state information;
generating the combination ad creative from the template, wherein generating the combination ad creative further comprises including multiple ads, wherein each ad targets a different correspondent in the new login session; and
serving the combination ad creative to the client.

2. The method of claim 1 wherein receiving the client state information further comprises receiving configuration information and session information.

3. The method of claim 2 wherein dynamically computing the template comprises:
combining a plurality of conversation windows from previous conversations with the correspondent into a conversation history window for said correspondent; and
configuring the template in a form factor to accommodate an advertisement adjacent to the conversation history windows.

4. The method of claim 3 wherein generating the combination ad creative comprises:
retrieving advertisements related to each open conversation window using the session information, wherein the advertisements are selected to correspond to at least one parameter in the session information; and
incorporating the retrieved advertisements such that each retrieved advertisement is positioned adjacent to the conversation history window to which it is associated, using the configuration information.

5. The method of claim 1 further comprising filtering the client state information to remove any information not required for generating the ad creative.

6. The method of claim 4 wherein receiving the session information comprises receiving a time-of-day parameter.

7. The method of claim 6 wherein the advertisements are retrieved based on the time-of-day parameter.

8. The method of claim 1 wherein serving the combination ad creative comprises serving the ads in a vertical path form factor.

9. The method of claim 1 wherein serving the combination ad creative comprises serving the ads in a storyboard form factor.

10. An information processing system comprising:
a client state information store storing client state information from open conversation windows of a client during a login session, wherein each open conversation window comprises a conversation between said client and a correspondent, such that said client is corresponding with a different correspondent in each window;
a server device in operative communication with the client, said server device comprising:
a processor device configured to perform:
monitoring the open conversation windows during the login session;

receiving client state information associated with each open conversation window, said client state information comprising:
- an indicator of content of the conversation between the client and the correspondent associated with that open conversation window; and
- an identifier of the correspondent;

sending the client state information for each open conversation window to the client state information store for storage;

receiving an indication of initiation of a new login session for the client;

retrieving, in response to the indicated new login session, the client state information associated with said new login session to dynamically compute a template for a customized ad creative customized for each open conversation window associated with the new login session, wherein said combination ad creative comprises multiple ads targeting the indicated content of previous conversation with identified correspondents as determined by the retrieved client state information;

an ad generator engine generating the combination ad creative from the template, wherein generating the combination ad creative further comprises including multiple ads, wherein each ad targets a different correspondent in the new login session; and a communication interface serving the combination ad creative to the client.

11. The information processing system of claim 10 wherein the client state information further comprises configuration information and session information.

12. The information processing system of claim 10 further comprising a filter filtering the client state information to remove any information not required for generating the ad creative.

13. The information processing system of claim 10 wherein the template comprises:
- at least one conversation history window combining a plurality of conversation windows from previous conversations with the correspondent; and
- a form factor to accommodate an advertisement adjacent to each conversation history window.

14. The information processing system of claim 10 wherein the session information comprises receiving a time-of-day parameter used to retrieve the advertisements.

15. A computer program product within a non-transitory computer readable storage medium comprising program code that when executed, causes a computer to perform steps of:
monitoring a plurality of open conversation windows of a client during a login session, wherein each open conversation window comprises a conversation between said client and a correspondent such that said client is corresponding with a different correspondent in each window;

receiving client state information associated with each open conversation window, said client state information comprising:
- an indicator of content of the conversation between the client and the correspondent associated with that open conversation window; and
- an identifier of the correspondent;

sending the client state information for each open conversation window to a client state information store for storage;

receiving an indication of initiation of a new login session for the client;

responsive to the initiation of a new login session, retrieving the client state information for the correspondents associated with said new login session;

dynamically computing a template for a combination ad creative customized for each open conversation window associated with the new login session, wherein said combination ad creative comprises multiple ads targeting indicated content of previous conversations with identified correspondents as determined by the retrieved client state information;

generating the combination ad creative from the template, wherein generating the combination ad creative further comprises including multiple ads, wherein each ad targets a different correspondent in the new login session; and serving the combination ad creative to the client.

16. The computer program product of claim 15 wherein receiving the client state information further comprises receiving configuration information and session information.

17. The computer program product of claim 16 wherein dynamically computing the template comprises:
- combining a plurality of conversation windows from previous conversations with the correspondent into a conversation history window for said correspondent; and
- configuring the template in a form factor to accommodate an advertisement adjacent to the conversation history windows.

18. The computer program product of claim 17 wherein generating the combination ad creative comprises:
- retrieving advertisements related to each open conversation window using the session information, wherein the advertisements are selected to correspond to at least one parameter in the session information; and
- incorporating the retrieved advertisements such that each retrieved advertisement is positioned adjacent to the conversation history window to which it is associated, using the configuration information.

19. The computer program product of claim 15 further comprising filtering the client state information to remove any information not required for generating the ad creative.

* * * * *